June 5, 1973 W. N. STRELCHUK 3,737,329
SAUSAGE CASING AND METHOD OF MANUFACTURE
Filed Sept. 25, 1970      2 Sheets-Sheet 1
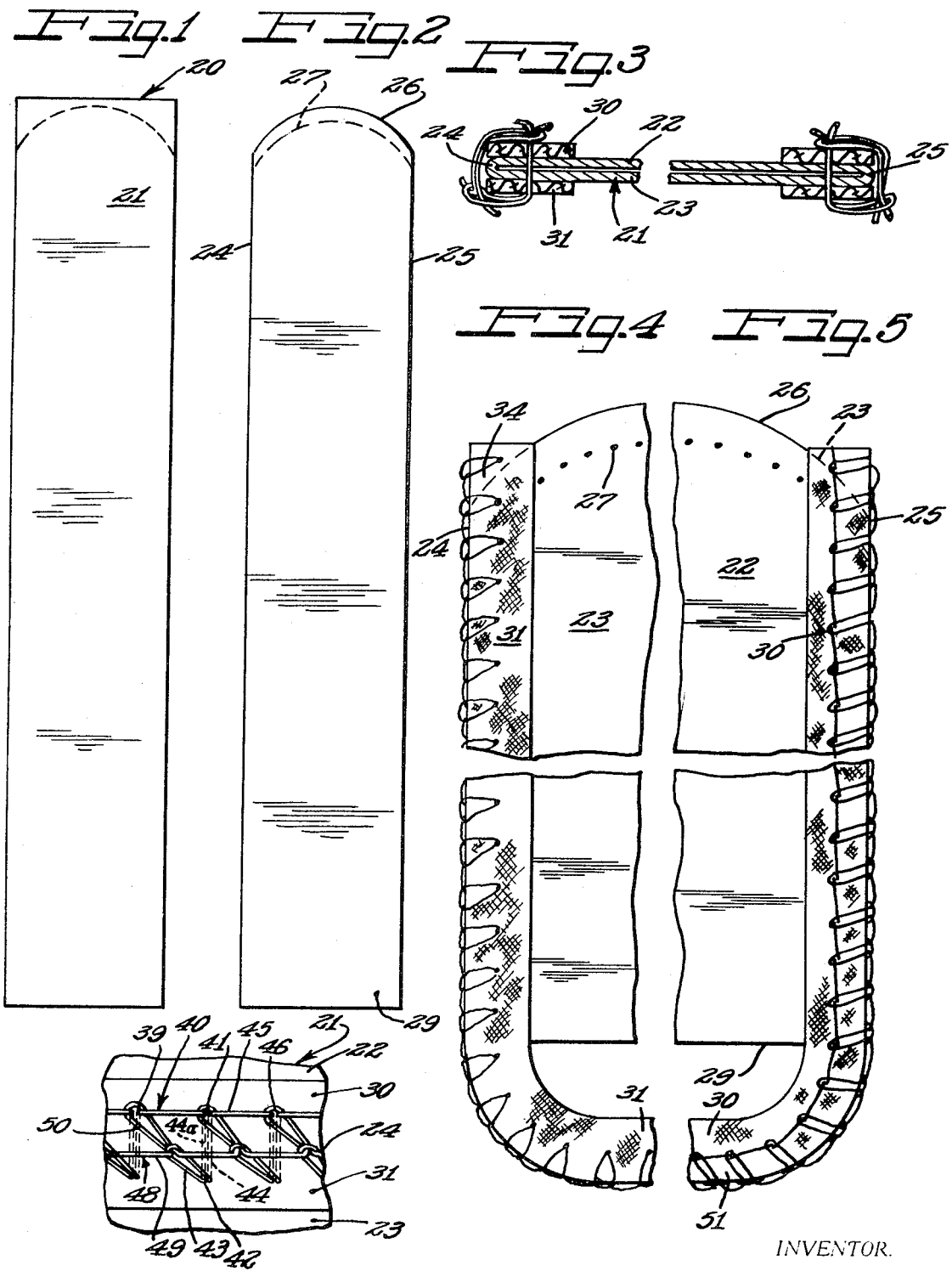
INVENTOR.
William N. Strelchuk
BY    ATTORNEYS

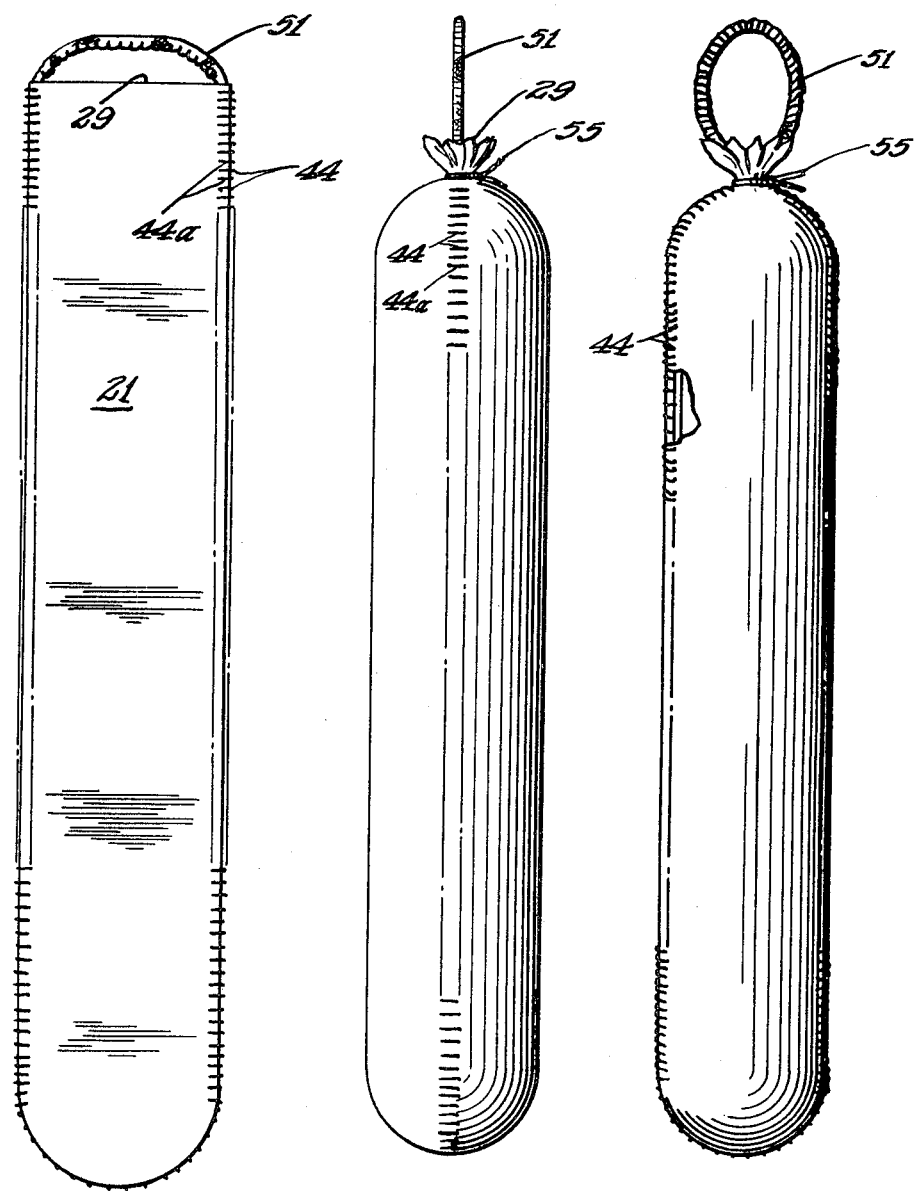

United States Patent Office 3,737,329
Patented June 5, 1973

3,737,329
SAUSAGE CASING AND METHOD OF
MANUFACTURE
William N. Strelchuk, Bloomfield Hills, Mich., assignor to
Hygrade Food Products Corporation, Detroit, Mich.
Filed Sept. 25, 1970, Ser. No. 75,575
Int. Cl. B65b 25/08
U.S. Cl. 99—175                                    9 Claims

ABSTRACT OF THE DISCLOSURE

A sausage casing and method of manufacture thereof which begins as a tubular member of sausage casing material which has an end thereof closed by stretching along a convex path and trimmed. Thereafter a pair of cloth tapes are placed on either side of the flattened casing material along marginal longitudinal portions thereof, and tapes being continuous and extending from the sewn end to the open end where a portion of the tape is left loose and then back along the other side of the flattened casing to the sewn end. Thereafter the tape is affixed to the casing material by a stitch wherein portions of the stitching thread extend through the tapes and casing material and portions extend around the marginal edges of the flattened casing material to lock the stitching through the material. The stitching is continued through the loose portion at the open end of the casing. After stitching the casing is inverted to place the cloth tapes on the interior thereof with a loose portion projecting out of the open end of the casing to provide a hanger loop.

BACKGROUND OF THE INVENTION

Field of the invention

This invention relates to sausage casing and to a method of manufacture thereof and more particularly to a sausage casing with an integral hanging loop.

Prior art

Sausage casings are normally comprised of an animal bung or a combined bung and liner which are sewed together and with one end thereof sewed close to provide a open ended tubular casing. The casing is thereafter stuffed with sausage material and the open end is closed and tied shut. Thereafter the stuffed casing may be smoked or cooked or otherwise processed. It has also been known (see for example, the patent to Hensen No. 2,042,227) to provide a hanging loop at one end of the casing so that it may be hung on a tree for subsequent processing. Provision of such hanging loops causes the end of the casing to stretch thereby providing an out-of-round partially filled or unfilled area. It has been suggested to eliminate this problem by hanging the casing in a net (see for example, the patent to Kern No. 1,828,668) as well as to attach the hanging loop to the casing by sewing it into the stitching of the liner. (See for example, the patent to Leur, Jr. No. 2,788,279). All prior art methods, however, have heretofore either required an extra article to receive the casing, as in the case of the nets, or have provided localized support as in those cases where the loop is attached to the end or sewn to a specific area of the thread.

It has also been known to utilize artificial sausage casings (see for example the patent to Schmidt No. 1,659,-375) and to provide reinforced side edges for the casing as for example in the patent to Gall No. 1,985,564.

However, the art to date has not provided a sausage casing which includes a provision for hanging where the hanging loop support is continuous along the lengths of the sausage.

SUMMARY OF THE INVENTION

This invention overcomes the disadvantages of the prior art by providing a sausage casing having a hanging loop wherein the loop is formed and attached to the casing in such a manner that the support extends along the major length of the casing. This is accomplished, in the preferred embodiment, by providing a tube of artificial casing material having a desired length. The tube is flattened and one end thereof is sewed off to close it. Thereafter two length of cloth strips are provided which are attached one to a side of the flattened casing along the margin thereof by a continuous stitch operation. The strips are attached by sewing their ends at the closed end of the casing and with an extended portion beyond the open end of the casing to provide a sewn loop. Because the strips are placed one on the side of the casing and because the sewing is continuous, the attachment of the loop to the casing becomes a continuous attachment along the length thereof. Therefore when the casing is later inverted, stuffed, tied and hung from the loop, the casing will be supported along its entire length.

The method of sewing used in the preferred embodiment involves a lock stitch which has thread sections extending through the two cloth strips and the casing material and locked therethrough by indexing thread sections extending around the side of the flattened casing, somewhat in the manner of double chain stitch. The provision of the stitching together with the attachment of the fabric strips substantially the length of the casing provides an extremely strong and firmly attached loop capable of hanging a heavy sausage without separation of the loop from the casing.

It is therefore an object of this invention to provide an improved sausage casing and method of manufacture.

It is a further object of this invention to provide a sausage casing with an attached hanger loop wherein the loop is attached to the casing substantially along the entire length.

It is yet another and more specific object of this invention to provide a sausage casing having hanging loop attached thereto, the loop comprising a strip of material attached to diametrically opposed points along the length of the sausage casing and having a loop at one end thereof.

It is yet another and specific object of this invention to provide an improved sausage casing having a hanging loop attached thereto by sewing a continuous strip from one end of the sausage along the entire length thereof and thence back along the entire length of the sausage at a diametrically opposed point leaving a loose loop at one end.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a plan view of an artificial sausage casing cut to length;

FIG. 2 is a view similar to FIG. 1 illustrating one end of the casing sewn closed and trimmed;

FIG. 3 is an enlarged fragmentary cross sectional view of a casing constructed according to the teachings of this invention;

FIG. 4 is a fragmentary plan enlarged view of sausage casing constructed according to the principles of this invention;

FIG. 5 is a view similar to FIG. 3 illustrating the other side of the sausage casing.

FIG. 6 is a plan flattened view of the stitching attaching the loop of the invention;

FIG. 7 is a plan view of the completed sausage casing prior to stuffing;

FIG. 8 is a plan view of the completed stuffed sausage casing; and

FIG. 9 is a view similar to FIG. 8 rotated 90° therefrom with a portion broken away to show underlying portions.

DESCRIPTION OF THE PREFERRED EMBODIMENT

FIG. 1 illustrates an artificial sausage casing 20. The casing 20 consists of a continuous tubular member 21 which is cut to a desired length. As best illustrated in FIG. 3 the tubular member 21 is compressed to a flat member having top 22, bottom 23 and sides with rounded edges 24 and 25.

After cutting the casing 20 to the desired length as a first operation, the second operation performed in producing the casing of this invention is illustrated in FIG. 2 where one end 26 of the casing has been trimmed to provide a convex or rounded section which has been sewed closed by stitching 27 spaced slightly from the end 26. Preferably, the stitching is along an arcuate path from the side 24 to the side 25. The stitching 27 extends entirely through the casing and is preferably of a locked type such as loop or chain stitching.

After end stitching as illustrated in FIG. 2 the hanger loop of this invention is applied. As best illustrated in FIG. 3, in the preferred embodiment, the loop consists of two strips of material, preferably cloth tape, 30 and 31 which are applied to the casing 21 along the top 22 and bottom 23 at marginal portions adjacent the sides 24 and 25 so that they overlie one another. In the combined FIGS. 4 and 5, FIG. 4 illustrates the opposite side from FIG. 5. For example, if FIG. 4 illustrates the bottom 23 of FIG. 3 then FIG. 5 illustrates the top 22. The strips of cloth 30 and 31 are continuous and are applied to the top and bottom faces of the casing as a continuous strip beginning from the rounded bottom 26 adjacent the corner 33 thereof at the intersection with the side 25 for the entire length of the side 25 to the open end 29 of the casing 21. A length of the strips 30 and 31 is then left at the open end of the casing and the strips are applied to the opposite side 25 from the open end 29 to the rounded bottom 26 at the intersection 34 thereof with the side 24.

The strips 30 and 31 are applied preferably by sewing and preferably by a double stitch whereby one portion of the thread pierces through the tapes 30 and 31 and through the casing 21 adjacent the edges 24 and 25 while another portion of the thread, interlocked with the first portion, extends around the outer edges 24 and 25 of the casing. Such a stitch is illustrated in FIGS. 3 through 6 with FIG. 6 being a flattened plan view of a portion of one of the sides 24 or 25 illustrating the strips 30 and 31 side by side. Such a stitch could be described as a double chain or lock stitch wherein one thread pierces the tape 30 and top 22 of the casing 21 through an aperture 41 thence through the interior as portion 44 of the casing spaced from the edge 24. The thread 40 then exits through an aperture 42 through the bottom 23 of the casing 21 and the tape 31 where it forms a loop 43. The thread then extends backwardly through the aperture 42 with a portion 44a interior of the casing and out through the aperture 41. A longitudinal segment 45 then extends to the next aperture 46 where the process is repeated. The thread 40 is interlocked with a thread 48 which has a portion 49 extending through the loop 43 thence forming a second loop 50 which extends around the portions of the thread 40 entering the aperture 39 and emerging from the aperture 39 to the aperture 41 thence back through the loop 43 and on to the next loop formed by the thread 40. In this manner the thread 48 remains exterior of the casing forming a wrap-around stitch along the sides 24 and 25 of the casing. The same stitching continues around the hanging loop 51 provided by the loose portion of the tapes 30 and 31 at the open end 29 of the casing.

It will of course be understood that although a specific stitching is herein described as a preferred embodiment, that any aceptable fastening stithcing could be employed, preferably one that has a portion passing through the entirety of the casing and a portion going around the exterior of the casing.

After the sausage casing with hanging loop of this invention has been constructed in this manner herein described, it is placed upon a horn and inverted as illustrated in FIG. 7. This will place the tapes 30 and 31 interiorly of the casing with the thread portions 44 and 44a exterior of the casing along diametrically opposed longitudinal points. This gives an aesthetic appearance to the casing so that it resembles a natural sewed casing. The hanger loop 51 will then project from the interior of the casing at the open end 29 thereof.

After inversion the casing may be stuffed with sausage material and tied off at the open end 29 as by a length of string 55 as illustrated in FIGS. 8 and 9. When stuffed, the hanger loop 51 extends from the tied off end of the sausage to hang the sausage on a tree for further processing.

Because the hanging loop 51 is integral with the tapes which are stitched to the entire length of the casing, the resultant construction is extremely strong with the sausage being supported substantially along its entire length. In this manner the hanging loop is prevented from separating from the sausage during further processing. The strength of the hanging loop is further augmented by the fact that the stitching, which begins at the corner 33 or 34, extends entirely around the sausage and loop thereby strengthening the loop itself.

Although this invention has been described in a preferred embodiment utilizing two strips of fabric 30 and 31, which are preferably a cloth fabric, it is to be understood that a single strip could be utilized which is bent into a U-shaped cross section with one leg of the U overlying the top of the casing in its flattened condition and the other leg of the U overlying the bottom thereof. However, the provision of two separate strips 30 and 31 eliminates the necessity of aligning the sausage with a U-shaped cross section tape along its edges.

Although minor modifications might be suggested by those versed in the art, it should be understood that I wish to embody within the scope of the patent warranted hereon all such modifications as reasonably and properly come within the scope of my contribution to the art.

I claim:

1. The method of manufacturing a sausage casing which comprises the steps of providing an open ended continuous walled tube of casing material, sewing one end of said tube closed, providing a strip of fabric along the longitudinal length of the casing at diametrically opposed points, the strip having a loose continuous portion at the open end of the tube, stitching the said strip to the said casing along substantially the entire longitudinal length of the casing at diametrically opposed points, the loose portion forming a loop at the open end, continuing the stitching through the loose portion and effecting the stitching of the strip to the casing by a stitch which has axially spaced portions extending through the strip and casing to provide a series of axially spaced circumferentially extending short straight stitches a diametrically opposed axial lines on the exterior of a casing inverted after stitching.

2. The method of claim 1 wherein the strip is provided on the exterior of the said casing and the casing is thereafter inverted whereby the loop projects out of the open end from the interior thereof.

3. The method of claim 1 wherein the tube is flattened and two strips of fabric are provided adjacent the edges thereof one on either side of the flattened casing, the two strips overlying one another.

4. The method of claim 1 wherein the stitching includes thread portions extending through the strip and casing interlocking with thread portions extending on the outside of the said casing.

5. In a sausage casing having a tubular continuous walled body with a closed end and an open end with a hanging strap attached thereto the improvement of said hanging strap secured to the casing substantially along the entire length of the casing said strap being secured to said casing by stitching along the diametrically opposed points of the said body, the said strap having ends terminating adjacent the closed end and an intermediate portion projecting beyond the said open end, said intermediate portion not stitched to said body, the strip is attached to the casing by stitching with a portion of the stitch extending through the strip and casing and a second portion of the stitching extending exterior of the casing and strip the said portion of the stitch extending through the strip and casing forming a series of axially spaced apart circumferentially extending short thread lengths forming rows of thread lengths at diametrically opposed portions of the casing on the exterior thereof when the casing is turned inside out so that the strip is disposed on the interior of the casing.

6. The improvements of claim 5 wherein the said strip is attached to the interior of the finished casing with the loop projecting out of the open end.

7. The improvement of claim 5 wherein two strips of cloth are attached to the casing in side-by-side relation with the stitching extending through one strip thence through the casing thence back through the casing and through the other strip.

8. The improvement of claim 7 wherein the two strips are disposed one atop the other in the loop portion and are sewn together.

9. A sausage casing comprising a casing body member, said casing body member being a continuous walled tube with axially spaced apart ends, one of said ends closed by stitching, the other of said ends open, said casing having a hanging strip secured thereto, said hanging strip comprising an elongated strip having spaced apart ends, said ends attached to said casing adjacent the closed end, an intermediate portion of said strip projecting beyond said open end, and portions of said strip from said ends to said intermediate portion stitched to the wall of the said casing at diametrically opposed axially extending lines on said casing, the said strip attached to the interior of said casing, the said strip attached by stitching, the said stitching forming a series of axially spaced apart circumferentially extending short thread portions exterior of the said casing, the thread portions being disposed in axial rows along diametrically opposed lines on the exterior of the casing.

References Cited
UNITED STATES PATENTS

| | | | |
|---|---|---|---|
| 445,881 | 2/1891 | Cussen | 150—28 R |
| 1,211,671 | 1/1917 | Bruder | 229—52 A |
| 1,761,390 | 6/1930 | Gumeiner | 150—28 R |
| 1,893,888 | 1/1933 | Goldwyn | 150—1 |
| 1,924,492 | 8/1933 | Goldwyn | 150—1 |
| 1,931,330 | 10/1933 | Sherman | 229—52 A |
| 2,096,161 | 10/1937 | Curran | 150—1 |
| 2,432,001 | 12/1947 | Fisler | 150—12 X |
| 1,717,075 | 6/1929 | Therox | 112—269 |
| 1,816,840 | 8/1931 | Goldwyn | 112—269 |
| 3,373,706 | 3/1968 | Armstead | 112—269 |

FOREIGN PATENTS

| | | | |
|---|---|---|---|
| 459,799 | 5/1928 | Germany | 99—176 |
| 480,422 | 8/1929 | Germany | 99—175 |
| 1,076,668 | 4/1954 | France | 229—54 |
| 1,424,488 | 12/1965 | France | 229—54 R |

FRANK W. LUTTER, Primary Examiner

R. HALPER, Assistant Examiner

U.S. Cl. X.R.

150—12; 229—54